(12) United States Patent
Norman (10) Patent No.: US 7,789,207 B2
(45) Date of Patent: Sep. 7, 2010

(54) STABILIZER

(76) Inventor: Ralph S. Norman, 8715 Dead Stick Rd., San Diego, CA (US) 92154

( * ) Notice: Subject to any disclaimer, the term of this patent is extended or adjusted under 35 U.S.C. 154(b) by 487 days.

(21) Appl. No.: 11/811,937

(22) Filed: Jun. 11, 2007

(65) Prior Publication Data

US 2008/0105506 A1    May 8, 2008

Related U.S. Application Data

(63) Continuation-in-part of application No. 11/787,922, filed on Apr. 17, 2007, and a continuation-in-part of application No. 11/062,278, filed on Feb. 17, 2005, now Pat. No. 7,510,063, and a continuation-in-part of application No. 10/801,626, filed on Mar. 15, 2004, which is a continuation-in-part of application No. 10/166,498, filed on Jun. 10, 2002.

(51) Int. Cl.
 *F16F 9/06* (2006.01)
(52) U.S. Cl. ........................... 188/306; 280/272
(58) Field of Classification Search ............ 188/290, 188/296, 306, 310; 280/272
See application file for complete search history.

(56) References Cited

U.S. PATENT DOCUMENTS

| | | | | |
|---|---|---|---|---|
| 1,506,495 | A | * | 8/1924 | MacRae ...................... 188/287 |
| 4,773,514 | A | * | 9/1988 | Gustafsson ................. 188/306 |
| 5,159,997 | A | * | 11/1992 | Heideman et al. ......... 188/282.1 |
| 5,988,329 | A | * | 11/1999 | Evans et al. ................. 188/296 |
| 6,705,631 | B2 | * | 3/2004 | Hasegawa et al. ........... 280/272 |
| 6,802,519 | B2 | * | 10/2004 | Morgan et al. .............. 280/272 |
| 6,817,265 | B2 | * | 11/2004 | Hasegawa et al. .......... 74/551.1 |
| 7,021,433 | B2 | * | 4/2006 | Yamada et al. .............. 188/294 |
| 7,044,489 | B2 | * | 5/2006 | Bunya et al. ................ 280/272 |
| 7,377,533 | B2 | * | 5/2008 | Takeuchi et al. ............ 280/272 |
| 7,510,063 | B2 | * | 3/2009 | Norman ...................... 188/310 |

* cited by examiner

*Primary Examiner*—Christopher P Schwartz
(74) *Attorney, Agent, or Firm*—Fehr Law Firm; Thompson E. Fehr (57) ABSTRACT

An improved stabilizer for the steering of a vehicle. The stabilizer comprises a housing containing one or more sector-shaped chambers with a wiper rotatably mounted in the housing. For each chamber a paddle extends from the rotor of the wiper into the chamber. The wiper moves sealingly past the housing. For each paddle a bypass channel allows fluid on one side of the paddle to move to the other side of the paddle. A valve in the bypass channel controls the degree of damping produced by the stabilizer. The valve has a control shaft in the center of the rotor, and on the shaft there is a continuous indentation around such shaft with there being no indentation in a first area of the shaft and then the indentation commencing and having an increasingly larger cross-sectional area as the indentation progress around the control shaft.

49 Claims, 4 Drawing Sheets

STABILIZER

CROSS-REFERENCE TO RELATED APPLICATION

This is a continuation-in-part of U.S. application Ser. No. 11/062,278, filed on Feb. 17, 2005, now U.S. Pat. No. 7,510,063 which is a continuation-in-part of copending U.S. application Ser. No. 10/166,498, filed on Jun. 10, 2002, and which is also a continuation-in-part of copending U.S. application Ser. No. 10/801,626, filed on Mar. 15, 2004. It is also a continuation-in-part of copending U.S. application Ser. No. 11/787,922, filed on Apr. 17, 2007.

BACKGROUND OF THE INVENTION

1. Field of the Invention

This invention relates to a device that uses a fluid to dampen a force which tends to move the plane of rotation of a steerable wheel or wheels of a vehicle having a shaft used to steer such wheel or wheels away from being generally parallel to the frame of such vehicle. It also relates to such a device for any steering mechanism, such as a ski of a snowmobile or the exhaust jet of a personal watercraft, that uses a shaft of the like and a handlebar or the like in the steering process. For convenience, the term "motorcycle" will be used herein; this term includes, through, not only a traditional motorcycle but also any vehicle using a steering mechanism as discussed in the preceding sentence.

2. Description of the Related Art

Dampening devices of the type subject to the present invention are those which contain a rotatable wiper (also called a vane) in a housing having a channel (or circuit) running from a portion of the housing on or near a first side of the wiper to a portion of the housing on or near a second side of the wiper so that when the housing is filled with fluid, as the wiper is moved, it forces fluid through the channel (or circuit). Such devices are herein termed either dampeners or stabilizers with the two terms being considered synonymous with one another.

Examples of such devices are those of U.S. Pat. Nos. 4,773,514; 6,401,884; U.S. patent application Ser. Nos. 10/801,626; and 11/062,278.

Generally, some form of valve is placed within the channel (or circuit) in order to control the degree of dampening. This is usually accomplished by varying the effective cross-sectional area of the channel (or circuit).

In the rotary damper of U.S. Pat. No. 6,899,208 the wiper consists of two types of elements—at least two paddle 13, 14 extend outward from a rotor 11. An orifice 27 on each side of each wiper 13, 14 proceeds linearly into the hollow center of the rotor 11, the orifices 27 and the hollow center of the rotor 11 thereby creating the channel (or circuit) within the rotor 11 portion of the wiper, rather than having the channel (or circuit) within the housing, or proceeding from the internal chamber of the housing through the housing into tubes leading from and subsequently returning back to the housing (as is done in U.S. Pat. No. 6,802,519 and in U.S. patent application Ser. No. 11/062,278).

The valve in the rotary damper of U.S. Pat. No. 6,899,208 is, according to lines 30 through 39 of column 2, simply a plug that is screwed up or down to increase the volume within the hollow center of the rotor 11: "The preferred embodiment contemplates a centrally located flow regulator 29 can be adjusted vertically by means of a threaded shaft 30 that is turned by a knob 31 on top of the damper. The shaft 30 is sealed by means of an o-ring at 32. The regulator 29 has a cylindrical surface on its circumference at 33 that will move vertically up and down blocking a portion and therefore reducing or increasing the size of the orifices 27 thereby causing variation in the damping effect."

In U.S. patent application Ser. No. 10/166,498, which was filed on Jun. 10 2002; United Kingdom patent no. 2 389 637, the application for which was filed on Jun. 10, 2002; U.S. Pat. No. 6,802,519, the application for which was filed on Sep. 9, 2002; and U.S. patent application Ser. No. 11/062,278, which was filed on Feb. 17, 2005, the valve is in a channel (or circuit) within the housing, or proceeding from the internal chamber of the housing through the housing into tubes leading from and subsequently returning back to the housing and comprises a shaft with a groove of increasing cross-sectional area, preferably created by the groove increasing in depth linearly as the groove proceeds around the shaft, which exists only part of the way around the shaft. The valve, therefore, depending upon the rotational position of the shaft, either completely or partially occludes the channel (or circuit) thereby varying and, hence, controlling the flow of fluid and, consequently, the damping created by the stabilizer.

Movement of the wiper relative to the housing is achieved by connecting the housing to the handlebars or to the shaft through which the handlebars turn the form wheel of a motorcycle or other steering mechanism, as discussed above, while rotatably attaching the wiper to the frame of the motorcycle. An arm is generally connected to the wiper. This arm may have the traditional aperture through which a pin rigidly attached to the frame of the motorcycle extends or may be of a pinless variety that has no aperture but is held within a yoke. This latter version is described in copending U.S. patent application Ser. No. 11/700,994.

Finally, a ball detent is a well-known mechanism for controlling the rotation of a wheel or know.

BRIEF SUMMARY OF THE INVENTION

The stabilizer of the present invention is similar to the stabilizer of U.S. Pat. No. 6,899,208 in that the channel (or circuit) enters the rotor on one side of a paddle and exits the rotor on the other side of the paddle. The valve, however, differs from the valve in U.S. Pat. No. 6,899,208; the valve is similar to the valve of the U.S. patent application Ser. No. 10/166,498, which was filed on Jun. 10, 2002; United Kingdom patent no. 2 389 637, the application for which was filed on Jun. 10, 2002; U.S. Pat. No. 6,802,519, the application for which was filed on Sep. 9, 2002; and U.S. patent application Ser. No. 11/062,278, which was filed on Feb. 17, 2005, since the valve comprises a shaft with a groove of increasing cross-sectional area, preferably created by the groove increasing in depth linearly as the groove proceeds around the shaft, which exists only part of the way around the shaft.

An additional distinction between the stabilizer of the present invention and the only other stabilizer with a valve that is within the wiper, i.e., the stabilizer of U.S. Pat. No. 6,899,208, is that the channel (or circuit) in the wiper does not proceed linearly into the hollow center of the rotor; rather, on at least one side of the valve, and preferably on both sides of the valve, the channel (or circuit) is non linear, most preferably containing a bend of substantially ninety degrees.

Additionally the knob on the upper end of the shaft for the valve has a top which bevels upward near the outer circular edge of the knob and contains visible indicators thereon. The amount of the beveling is selected such that only one such indicator will be clearly visible to a rider of a motorcycle when the rider has the rider's head in the traditional motorcycle racing position. The indicators are coordinated with the position of the shaft and thereby inform the rider of the current degree of damping. And, using a well-known ball detent, the knob can be rotated in fixed documents.

DETAILED DESCRIPTION OF THE INVENTION

Figure 1:
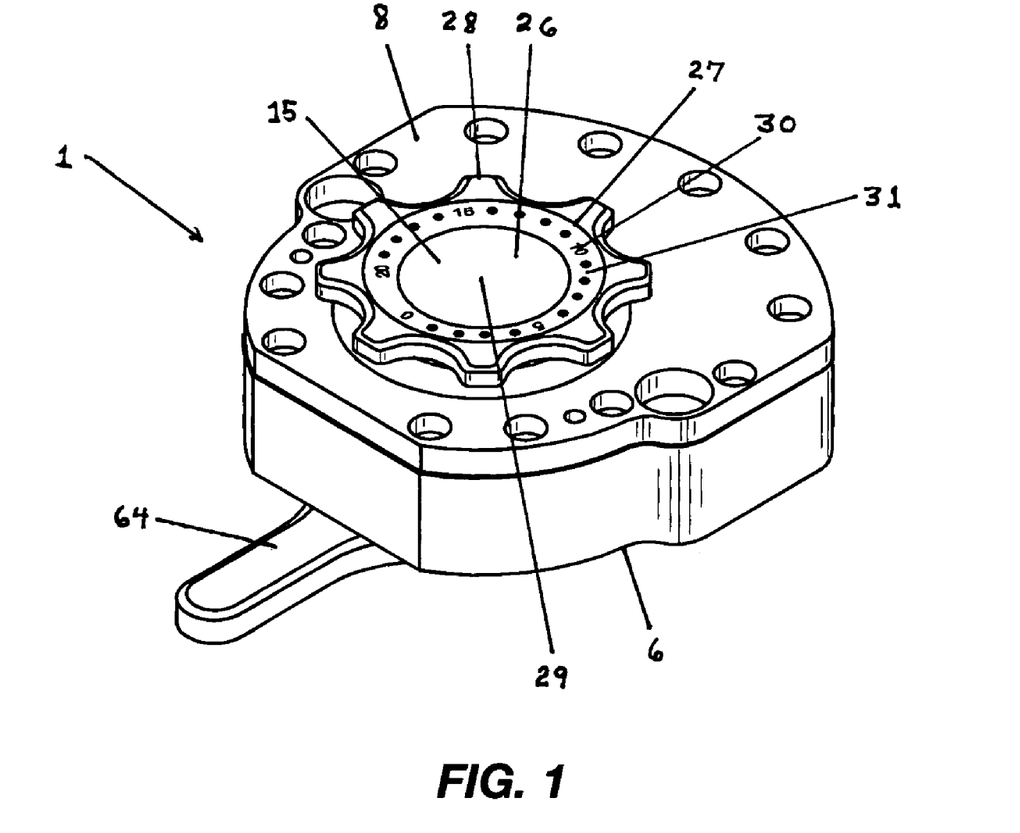
FIG. 1 provides a perspective view for a preferred embodiment of the Improved Stabilizer.
Figure 2:
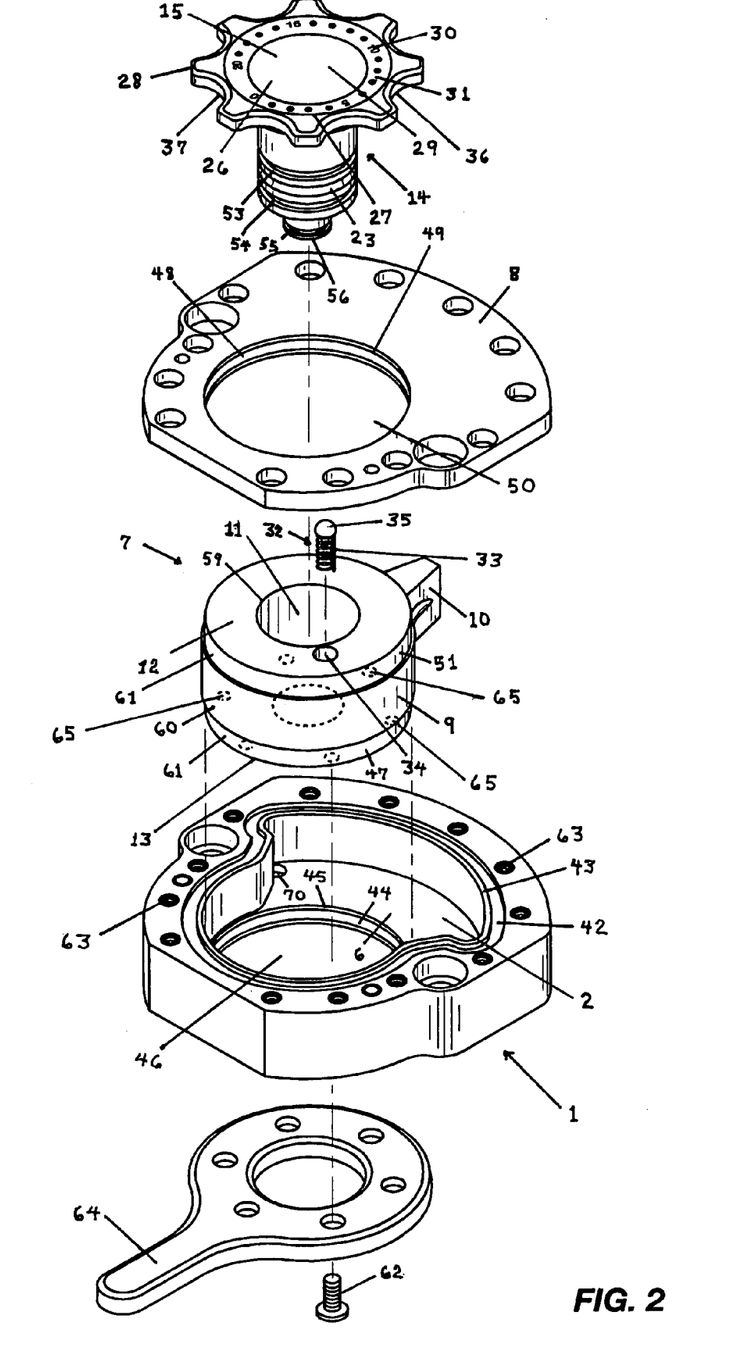
FIG. 2 is an exploded view for the embodiment of FIG. 1.
Figures 3, 4:
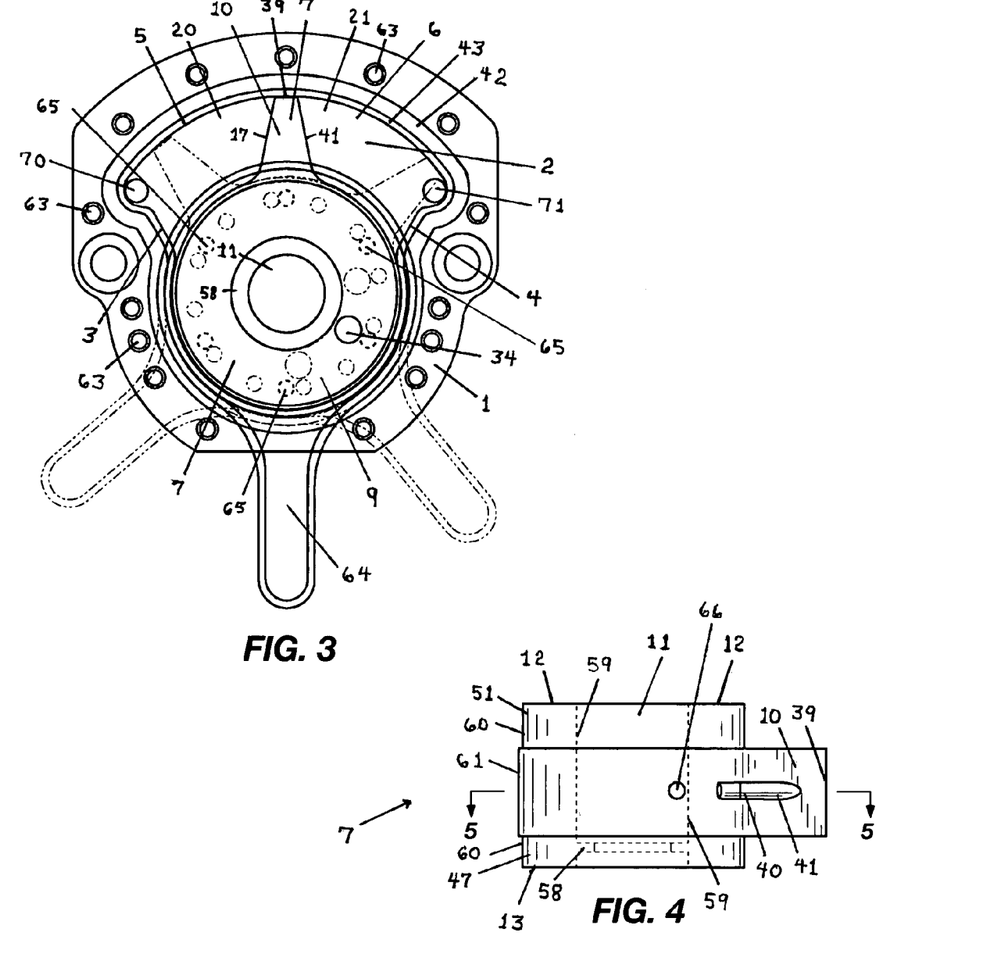
FIG. 3 shows the embodiment of FIG. 1 with the cover removed.
FIG. 4 is a lateral view of a preferred embodiment of the wiper.

The preferred embodiment of the Improved Stabilizer of the present invention comprises—as shown in FIG. 1, in FIG. 2 (in exploded form), and in FIG. 3—a housing 1 having a generally sector-shaped chamber 2 with a first side wall 3, a second side wall 4, a peripheral wall 5, a bottom 6, and a rotatably mounted wiper 7. Preferably, faceplate 8 is sealingly mounted to the housing 1 to constitute the top of the housing 1, although the top of the housing 1 could be integral with the housing 1 so long as the wiper 7 can be introduced into the housing 1 with any means know in the art. And, as discussed above, the wiper 7 has dimensions such that it sealingly move past the faceplate 8, the housing 1 at the bottom 6 of the chamber 2, and the peripheral wall 5 of the housing 1.

Figure 5:
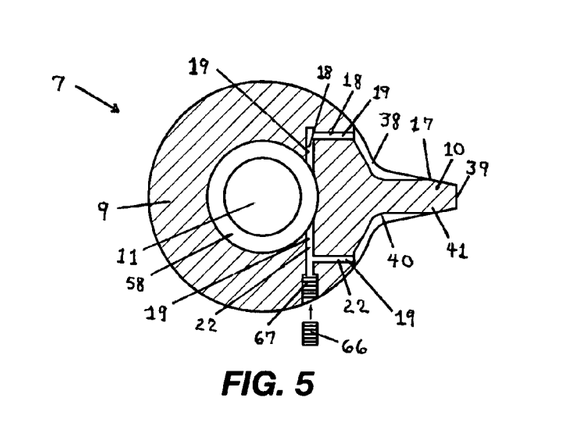
FIG. 5 is a cutaway view of the preferred embodiment of the wiper taken along line 5-5 in FIG. 4 looking in the direction of the arrows.

The wiper 7 comprises, as seen in FIGS. 2, 3, 4, 5, 6 and 8, a rotor 9 and a paddle 10 extending outward from the rotor 9. Furthermore, the rotor 9 has, as depicted in FIGS. 4 and 5, a cylindrically shaped hollow interior 11 running from the top 12 to the bottom 13 of the rotor 9.

Figure 6:
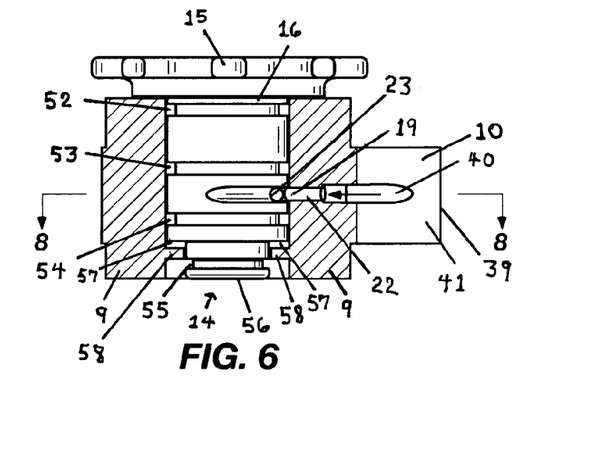
FIG. 6 is a lateral view of a preferred embodiment of the control shaft, which has been inserted into the preferred embodiment of the wiper of FIG. 4.
Figure 7:
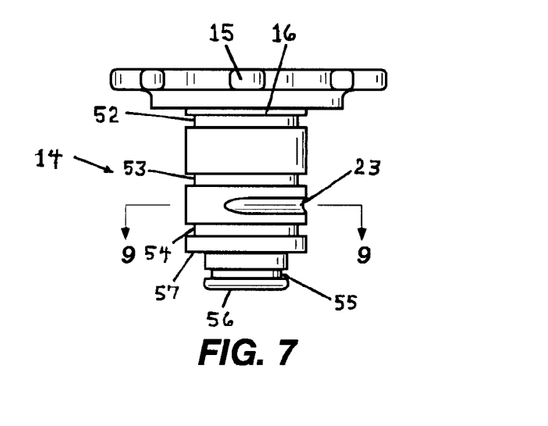
FIG. 7 is a lateral view of the preferred embodiment of the control shaft from FIG. 6 without the control shaft being inserted into the wiper.

A control shaft 14, portrayed in FIGS. 2, 6, and 7, is sealingly and rotatably mounted within the interior 11 of the rotor 9 with a knob 15 preferably at the top 16 of the control shaft 14 above the top 12 of the rotor 9.

On a first side 17 of the paddle 10, either within the paddle 10, itself, or within the rotor 9 (as illustrated in FIGS. 4, 5, 6, and 8), a first segment 18 of a channel (or circuit) 19 provides fluid communication between (a) the first side 20 of the chamber 2 of the housing 1 within which the wiper 7 is located, the wiper 7 dividing, as shown in FIG. 3, the chamber 2 into the first side 20 and a second side 21, and (b) the interior 11 of the rotor 9. Similarly, a second segment 22 of the channel (or circuit) 19 provides fluid communication between (c) the second side 21 of the chamber 2 and (d) the interior 11 of the rotor 9.

A continuous indentation 23 commences and has an increasingly larger cross-sectional area, preferably by becoming deeper as it progresses around the shaft 14 until continuous indentation 23 stops upon reaching the first area 24.

Figure 8:
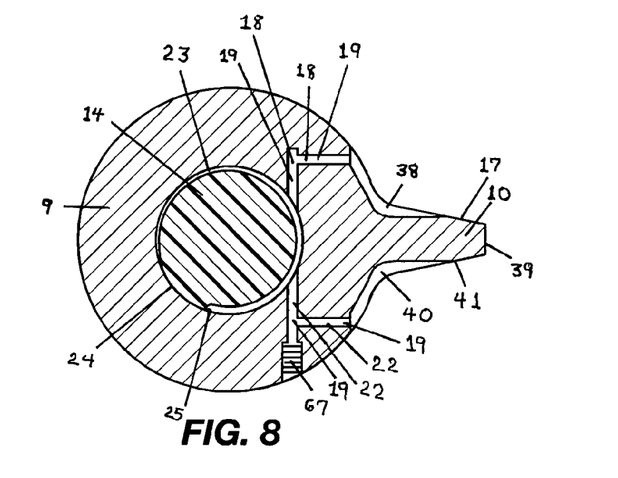
FIG. 8 is a cutaway view of the preferred embodiment of the control shaft from FIG. 6 and the preferred embodiment of the wiper from FIG. 4 taken along the line 8-8 in FIG. 6 looking in the direction of the arrows.
Figure 9:
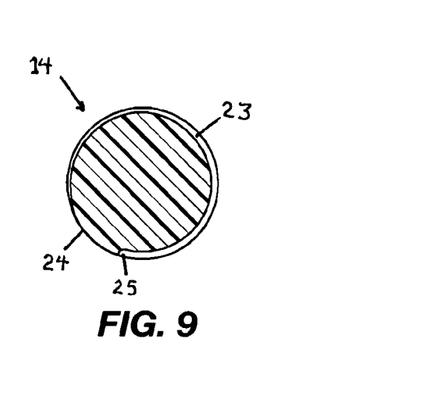
FIG. 9 is a cutaway view of the preferred embodiment of the control shaft from FIG. 6 and the preferred embodiment of the wiper from FIG. 4 taken along the line 9-9 in FIG. 7 looking in the direction of the arrows.

The control shaft 14 is so aligned with the first segment 18 and the second segment 22 of the channel (or circuit) 19 that the first segment 18, the second segment 22, and the continuous indentation 23 form the complete channel (or circuit) 19, as can be seen in FIGS. 6 and 8. The control shaft 14, therefore, completely blocks the bypass channel (or circuit) 19 when the first area 24 has been rotated into the bypass channel (or circuit) 19; preferably leaves the bypass channel (or circuit) 19 substantially completely open when the area 25 immediately preceding the area 24 where the continuous indentation 23 ends, i.e., the area 25 with the largest cross section (preferably, as a result of being the area with the deepest point of the indentation 23) has been rotated into the by pass channel (or circuit) 19; and continuously varies the percentage of opening of the bypass channel (or circuit) 19 when areas between area 24 and area 25 are rotated into the bypass channel (or circuit) 19. Dampening is of course maximized when the bypass channel (or circuit) 19 is completely closed and minimized when the bypass channel (or circuit) 19 is completely opened.

Surprisingly, when both the first segment 18 of the bypass channel (or circuit) 19 and the second segment 22 or the channel (or circuit) where linear, as in the case of the orifices 27 of U.S. Pat. No. 6,899,208, the present inventor discovered that the stabilizer worked, but only to such a limited extent that damping was significantly less than that attainable with traditional stabilizers, even when the segments 18, 22 were made extremely small. Consequently, the present inventor has concluded that at lest one of the first and second segments 18, 22 should be nonlinear, as illustrated in FIGS. 5 and 8. And when the present inventor constructed a stabilizer wherein the first and second segment 18, 22 each contained a bend of substantially ninety degrees, as shown in FIGS. 5 and 8, the stabilizer provided damping equivalent to that of a traditional stabilizer. (It should be noted, however, that although the present inventor believes that only one of the segments 18, 22 need to be nonlinear and that the degree of nonlinearity can be less than a bend of substantially ninety degrees, the present inventor has not constructed either a stabilizer with only one of the segments 18, 22 being nonlinear or a stabilizer where the nonlinearity is less than a bend of substantially ninety degrees.) Having both the first and second segments 18, 22 contain a bend of substantially ninety degrees is, therefore, the inventor's most preferred embodiment.

As indicated above and shown in FIGS. 1 and 2, the top 26 of the knob 15 preferably bevels upward near the outer circular edge 27 of the knob 15 (A scalloped outer edge 28 actually exists outward from the outer circular edge 27 in order to facilitate gripping the knob 15 but is immaterial to the beveling and its function.), causing the outer circular edge 27 to be higher than the central portion 29. (Alternatively, but less preferably, the beveling could be done in reverse, i.e., the central portion 29 could be higher than the outer circular edge 27.) Indicators 30, such as numbers, designate the position of the knob 15 and, consequently, the rotational position of the control shaft 14 and, consequently, the continuous indentation 23 so that a rider will know the resultant degree of damping which has been selected. These numbers are placed on the beveled portion 31 of the top 26 of the knob 15, and the amount of beveling is selected such that only one such indicator 30 will be clearly visible to a rider of a motorcycle when the rider has the rider's head in the traditional motorcycle racing position.

Furthermore, using, as illustrated in FIG. 2, a well-known ball detent 32 with the spring 33 of the ball detent 32 located within a cavity 34 in the rotor 9 and the ball 35 projecting from such cavity 34 and pressing against detents 36 in the bottom 37 of the knob 15 enables the knob 15, and, consequently, the control shaft 14 to be turned in known increments.

Preferably, a first cavity 38 runs, as depicted in FIGS. 4 through 6, on the first side 17 of the paddle 10 from near the free end 39 of the paddle 10 to the first segment 18 of the bypass channel (or circuit) 19 that provides fluid communication between (a) the first side 20 of the chamber 2 of the housing 1 within which the wiper 7 is located and (b) the interior 11 of the rotor 9. This facilitates the flow of fluid into first segment 18 of the bypass channel (or circuit) 19 when the first side 17 of the paddle 10 nears the first side wall 3 of the chamber 2. Similarly and preferably, a second cavity 40 runs on the second side 41 of the paddle 10 from near the free end 39 of the paddle 10 to the second segment 22 of the bypass channel (or circuit) 19 that provides fluid communication between (a) the second side 21 of the chamber 2 of the housing 1 within which the wiper 7 is located and (b) the interior 11 of the rotor 9. This facilitates the flow of fluid into the second segment 22 of the bypass channel (or circuit) 19 when the first side 17 of the paddle 10 nears the second side wall 4 of the chamber 2.

In order to prevent the leakage of fluid from the chamber 2 a number of seals of the type known in the art are employed. Such a seal is placed in the upper groove 42 of the housing 1 near the periphery 43 of the chamber 2; in the groove 44 within the inner edge 45 of the bottom 6 of the chamber 2 surrounding an aperture 46 into which the lower portion 47 of the rotor 9 fits, such seal preferably being a traditional o-ring; in the groove 48 within the inner edge 49 of the faceplate 8 surrounding an aperture 50 into which the upper portion 51 of the rotor 9 fits, such seal preferably being a traditional o-ring; in the groove 52 near the top 16 or the control shaft 14, such seal preferably being a traditional o-ring; in the groove 53 above and near the continuous indentation 23, such seal preferably being a traditional o-ring; and in the groove 54 below and near the continuous indentation 23.

A groove 55 for a keeper ring is located near the bottom 56 of the control shaft 14. Just above and also below the groove 55 for the keeper ring the control shaft 14 is, as illustrated in FIGS. 4 and 6, narrower than it is above, creating a shelf 57 which is removably located above an inward projection 58 from the interior wall 59 of the rotor 9 which surrounds the hollow interior 11 of the rotor 9. Consequently, since the knob 15 is preferably wider than the hollow interior 11 of the rotor 9, both the knob 15, in conjunction with the rotor 9, itself, and the inward projection in conjunctions with the shelf 57 preclude the control shaft 14 from falling out the bottom 13 of the rotor 9. Similarly, having in the groove 55 any keeper ring that is well known in the art precludes the control shaft 14 form being removed from the top 12 of the rotor 9.

Also, preferably the vertically middle portion 60 of the exterior side 61 of the rotor 9 extends, as portrayed in FIG. 4, outward a sufficient distance that it is past the inner edge 45 of the bottom 6 of the chamber 2 and also past the inner edge 49 of the faceplate 8 in order to enhance the effect of the paddle 10 in precluding the rotor 9 form passing through either (a) the aperture 46 in the bottom 6 of the chamber 2 into which the lower portion 47 of the rotor 9 fits or (b) the aperture 50 in the faceplate into which the upper portion 51 of the rotor 9 fits.

Preferably, screws 62 are, as illustrated in FIG. 2, utilized to attach the faceplate 8 to threaded channels 63 in the housing 1 and also to connect the arm 64 to threaded channels 65 in the bottom 13 of the rotor 9. Similarly, as shown in FIGS. 5 and 8, a threaded plug 66 is preferably utilized both (a) to close the threaded aperture 67 in the rotor that is created by the preferred method, i.e., drilling, of making the innermost portion 68 of the first segment 18 of the bypass channel (or circuit) 19 and the innermost portion 69 of the second segment 22 of the bypass channel (or circuit) 19 and (b) to close the apertures 70, 71 in the bottom 6 of the chamber 2 that server as an alternate to removing the faceplate 8 for filling the chamber 2 with fluid.

Also preferably, there is one chamber 2. There can, however, be more than one chamber 2 provided that a paddle 10 is attached to the rotor 9 in each chamber 2, as described above for a single chamber 2. When there is more than one, chamber 2 there must also be a first segment 18 and a second segment 22 of a bypass channel (or circuit) 19 for each chamber 2, although the portion 72 of the bypass channel (or circuit) 19 which is adjacent to the continuous indentation 23 in the control shaft 14 may be common (communicating with the segments 18, 22 for all chambers 2). It is, though, preferable to have a vertically separated portion 72 for each chamber 2.

Any fluid that is known in the art for use in steering stabilizers may be utilized in the present invention. This includes, but is not necessarily limited to, motor oil and transmission fluid.

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

I claim:

1. An improved stabilizer for a vehicle of the type having a (a) housing with a generally sector-shaped chamber having a first side wall, a second side wall, a peripheral wall, a bottom, and a top, (b) a wiper comprising a rotor and, extending outward from the rotor, an attached paddle rotatably mounted in the chamber of the housing and having dimensions such that the wiper sealingly moves past the top, the bottom, and peripheral wall of the housing, the wiper also containing a bypass channel which is in fluid communication with the chamber on both sides of the paddle, (c) a valve in the bypass channel, (d) a means for connecting the housing to a steering mechanism of the vehicle, and (e) a means for connecting the wiper to an arm, wherein the improvement comprises:

a knob connected to the valve and being above the housing, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

2. An improved stabilizer for a vehicle of the type having a (a) housing with a generally sector-shaped chamber having a first side wall, a second side wall, a peripheral wall, a bottom, and a top, (b) a wiper comprising a rotor and, extending outward from the rotor, an attached paddle rotatably mounted in the chamber of the housing and having dimensions such that the wiper sealingly moves past the top, the bottom, and peripheral wall of the housing, the wiper also containing a bypass channel which is in fluid communication with the chamber on both sides of the paddle, (c) a valve in the bypass channel, (d) a means for connecting the housing to a steering mechanism of the vehicle, and (e) a means for connecting the wiper to an arm, wherein the improvement comprises:

the rotor of the wiper having a cylindrically shaped hollow interior;

the valve comprising:

a control shaft having a top and being sealingly and rotatably mounted within the interior of the rotor, said control shaft having a continuous indentation around said shaft with there being no indentation in a first area of the shaft and then the indentation commencing and having an increasingly larger cross-sectional area as the indentation progress around said control shaft until the continuous indentation stops upon reaching the first area of said control shaft; and the bypass channel comprising:

a first segment providing fluid communication between a first side of the chamber, the chamber being divided by the wiper into a first side and a second side, and the interior of the rotor; and a second segment providing fluid communication between the second side of the chamber and the interior of the rotor, said first and second segments being so aligned with said control shaft that said first segment, said second segment, and the continuous indentation form the complete bypass channel and at least one of said first and second segments being nonlinear.

3. The improved stabilizer as recited in claim 2, wherein: the nonlinearity comprises a bend of substantially ninety degrees.

4. The improved stabilizer as recited in claim 2, further comprising:

a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

5. The improved stabilizer as recited in claim 4, wherein: the nonlinearity comprises a bend of substantially ninety degrees.

6. The improved stabilizer as recited in claim 4, wherein: the wiper contains a first cavity on a first side of the paddle running from near a free end of the paddle to the first segment of the bypass channel and a second cavity on a second side of the paddle running from near the free end of the paddle to the second segment of the bypass channel.

7. The improved stabilizer as recited in claim 6, wherein: the nonlinearity comprises a bend of substantially ninety degrees.

8. The improved stabilizer as recited in claim 2, wherein: the wiper contains a first cavity on a first side of the paddle running from near a free end of the paddle to the first segment of the bypass channel and a second cavity on a second side of the paddle running from near the free end of the paddle to the second segment of the bypass channel.

9. The improved stabilizer as recited in claim 8, wherein: the nonlinearity comprises a bend of substantially ninety degrees.

10. The improved stabilizer as recited in claim 2, wherein: both the said first and second segments of the bypass channel are nonlinear.

11. The improved stabilizer as recited in claim 10, wherein: the nonlinearity comprises a bend of substantially ninety degrees.

12. The improved stabilizer as recited in claim 10, further comprising:

a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

13. The improved stabilizer as recited in claim 12, wherein: the nonlinearity comprises a bend of substantially ninety degrees.

14. The improved stabilizer as recited in claim 12, wherein: the wiper contains a first cavity on a first side of the paddle running from near a free end of the paddle to the first segment of the bypass channel and a second cavity on a second side of the paddle running from near the free end of the paddle to the second segment of the bypass channel.

15. The improved stabilizer as recited in claim 14, wherein: the nonlinearity comprises a bend of substantially ninety degrees.

16. The improved stabilizer as recited in claim 10, wherein: the wiper contains a first cavity on a first side of the paddle running from near a free end of the paddle to the first segment of the bypass channel and a second cavity on a second side of the paddle running from near the free end of the paddle to the second segment of the bypass channel.

17. The improved stabilizer as recited in claim 16, wherein: the nonlinearity comprises a bend of substantially ninety degrees.

18. An improved stabilizer for a vehicle of the type having a (a) housing with at least two generally sector-shaped chambers each having a first side wall, a second side wall, a peripheral wall, a bottom, and a top, (b) in the housing a wiper comprising a rotor with, for each chamber, a paddle extending outward from the rotor into each chamber, with the rotor being rotatably mounted in the housing and having dimensions such that the wiper sealingly moves past the top, the bottom, and peripheral wall of each chamber, the wiper also containing a bypass channel for each chamber which bypass channel is in fluid communication with the chamber on both sides of the paddle, (c) a valve in the bypass channels, (d) a means for connecting the housing to a steering mechanism of the vehicle, and (e) a means for connecting the wiper to an arm, wherein the improvement comprises:

the rotor of the wiper having a cylindrically shaped hollow interior;

the valve comprising:

a control shaft having a top and being sealingly and rotatably mounted within the interior of the rotor, said control shaft having a continuous indentation around said shaft for each chamber with there being no indentation in a first area of the shaft and then the indentation commencing and having an increasingly larger cross-sectional area as the indentation progress around said control shaft until the continuous indentation stops upon reaching the first area of said control shaft; and the bypass channels, each comprising:
- a first segment providing fluid communication between a first side of the chamber, the chamber being divided by the wiper into a first side and a second side, and the interior of the rotor; and
- a second segment providing fluid communication between the second side of the chamber and the interior of the rotor, said first and second segments being so aligned with said control shaft that said first segment, said second segment, and one of the continuous indentations form the complete bypass channel for a given chamber and at least one of said first and second segments for each bypass channel being nonlinear.

19. The improved stabilizer as recited in claim 18, wherein: the nonlinearity comprises a bend of substantially ninety degrees.

20. The improved stabilizer as recited in claim 18, further comprising:
a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

21. The improved stabilizer as recited in claim 20, wherein: the nonlinearity comprises a bend of substantially ninety degrees.

22. The improved stabilizer as recited in claim 20, wherein: the wiper contains a first cavity on a first side of each paddle running from near a free end of the paddle to the first segment of the bypass channel and a second cavity on a second side of each paddle running from near the free end of the paddle to the second segment of the bypass channel.

23. The improved stabilizer as recited in claim 22, wherein: the nonlinearity comprises a bend of substantially ninety degrees.

24. The improved stabilizer as recited in claim 18, wherein: the wiper contains a first cavity on a first side of each paddle running from near a free end of the paddle to the first segment of the bypass channel and a second cavity on a second side of each paddle running from near the free end of the paddle to the second segment of the bypass channel.

25. The improved stabilizer as recited in claim 24, wherein: the nonlinearity comprises a bend of substantially ninety degrees.

26. The improved stabilizer as recited in claim 18, wherein: both the first and second segments of each bypass channel are nonlinear.

27. The improved stabilizer as recited in claim 26, wherein: the nonlinearity comprises a bend of substantially ninety degrees.

28. The improved stabilizer as recited in claim 26, further comprising:
a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

29. The improved stabilizer as recited in claim 28, wherein: the nonlinearity comprises a bend of substantially ninety degrees.

30. The improved stabilizer as recited in claim 28, wherein: the wiper contains a first cavity on a first side of each paddle running from near a free end of the paddle to the first segment of the bypass channel and a second cavity on a second side of each paddle running from near the free end of the paddle to the second segment of the bypass channel.

31. The improved stabilizer as recited in claim 30, wherein: the nonlinearity comprises a bend of substantially ninety degrees.

32. The improved stabilizer as recited in claim 26, wherein: the wiper contains a first cavity on a first side of each paddle running from near a free end of the paddle to the first segment of the bypass channel and a second cavity on a second side of each paddle running from near the free end of the paddle to the second segment of the bypass channel.

33. The improved stabilizer as recited in claim 32, wherein: the nonlinearity comprises a bend of substantially ninety degrees.

34. An improved stabilizer for a vehicle of the type having a (a) housing with at least two generally sector-shaped chambers each having a first side wall, a second side wall, a peripheral wall, a bottom, and a top, (b) in the housing a wiper comprising a rotor with, for each chamber, a paddle extending outward from the rotor into each chamber, with the rotor being rotatably mounted in the housing and having dimensions such that the wiper sealingly moves past the top, the bottom, and peripheral wall of each chamber, the wiper also containing a bypass channel for each chamber which bypass channel is in fluid communication with the chamber on both sides of the paddle, (c) a valve in the bypass channels, (d) a means for connecting the housing to a steering mechanism of the vehicle, and (e) a means for connecting the wiper to an arm, wherein the improvement comprises:
the rotor of the wiper having a cylindrically shaped hollow interior;
the valve comprising:
- a control shaft having a top and being sealingly and rotatably mounted within the interior of the rotor, said control shaft having a continuous indentation around said shaft with there being no indentation in a first area of the shaft and then the indentation commencing and having an increasingly larger cross-sectional area as the indentation progress around said control shaft until the continuous indentation stops upon reaching the first area of said control shaft; and the bypass channels, comprising:
- a first segment for each for each chamber, such first segment providing fluid communication between a first side of the chamber, the chamber being divided by the wiper into a first side and a second side, and the interior of the rotor with all such first segments joining together to form a first common segment no later than the point where such first segments reach the interior of the rotor; and
- a second segment for each chamber, such second segment providing fluid communication between the second side of the chamber and the interior of the rotor with all such second segments joining together to form a second common segment no later than the point where such second segments reach the interior of the rotor, such first and second common segments being so aligned with said control shaft that such first segments, such second segments, such first common segment, said second common segment, and the continuous indentation forming the complete bypass channel for a given chamber so that in the bypass channel on at least one side of the continuous indentation a nonlinearity exists for any path that fluid can take through the bypass channel.

35. The improved stabilizer as recited in claim 34, wherein: the nonlinearity comprises a bend of substantially ninety degrees.

36. The improved stabilizer as recited in claim 34, further comprising:
a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

37. The improved stabilizer as recited in claim 36, wherein: the nonlinearity comprises a bend of substantially ninety degrees.

38. The improved stabilizer as recited in claim 36, wherein: the wiper contains a first cavity on a first side of each paddle running from near a free end of the paddle to the first segment of the bypass channel and a second cavity on a second side of each paddle running from near the free end of the paddle to the second segment of the bypass channel.

39. The improved stabilizer as recited in claim 38, wherein: the nonlinearity comprises a bend of substantially ninety degrees.

40. The improved stabilizer as recited in claim 34, wherein: the wiper contains a first cavity on a first side of each paddle running from near a free end of the paddle to the first segment of the bypass channel and a second cavity on a second side of each paddle running from near the free end of the paddle to the second segment of the bypass channel.

41. The improved stabilizer as recited in claim 40, wherein: the nonlinearity comprises a bend of substantially ninety degrees.

42. The improved stabilizer as recited in claim 34, wherein: a nonlinearity exists in the bypass channel on both sides of the continuous indentation for any path that fluid can take through the bypass channel.

43. The improved stabilizer as recited in claim 42, wherein: each nonlinearity comprises a bend of substantially ninety degrees.

44. The improved stabilizer as recited in claim 42, further comprising:
a knob at the top of the control shaft, said knob having an outer circular edge and a top and having the top bevel upward near the outer circular edge of said knob with indicators of position being placed on the beveled portion of the top of the knob, with the amount of such beveling being selected such that only one indicator is clearly visible to the operator of a vehicle on which the stabilizer has been installed.

45. The improved stabilizer as recited in claim 44, wherein: each nonlinearity comprises a bend of substantially ninety degrees.

46. The improved stabilizer as recited in claim 44, wherein: the wiper contains a first cavity on a first side of each paddle running from near a free end of the paddle to the first segment of the bypass channel and a second cavity on a second side of each paddle running from near the free end of the paddle to the second segment of the bypass channel.

47. The improved stabilizer as recited in claim 46, wherein: each nonlinearity comprises a bend of substantially ninety degrees.

48. The improved stabilizer as recited in claim 42, wherein: the wiper contains a first cavity on a first side of each paddle running from near a free end of the paddle to the first segment of the bypass channel and a second cavity on a second side of each paddle running from near the free end of the paddle to the second segment of the bypass channel.

49. The improved stabilizer as recited in claim 48, wherein: each nonlinearity comprises a bend of substantially ninety degrees.

* * * * *